US012583196B2

(12) United States Patent
    Wu

(10) Patent No.: US 12,583,196 B2
(45) Date of Patent: Mar. 24, 2026

(54) PROCESS AND A SYSTEM FOR MANUFACTURING A HIGH SELF-SEALING TYRE, AND A HIGH SELF-SEALING TYRE MANUFACTURED BY THE SAME

(71) Applicant: TOHOKU ANZENGARASU LTD, Akita-city (JP)

(72) Inventor: Shangju Wu, Shanghai (CN)

(73) Assignee: TOHOKU ANZENGARASU LTD, Akita-city (JP)

( * ) Notice: Subject to any disclaimer, the term of this patent is extended or adjusted under 35 U.S.C. 154(b) by 159 days.

(21) Appl. No.: 17/791,727

(22) PCT Filed: Sep. 7, 2020

(86) PCT No.: PCT/JP2020/033763

§ 371 (c)(1),
(2) Date: Jul. 8, 2022

(87) PCT Pub. No.: WO2021/140702

PCT Pub. Date: Jul. 15, 2021

(65) Prior Publication Data

US 2023/0031900 A1 Feb. 2, 2023

(30) Foreign Application Priority Data

Jan. 8, 2020 (JP) ................................. 2020-001114

(51) Int. Cl.
    B29D 30/06 (2006.01)
    B05B 13/06 (2006.01)
    (Continued)

(52) U.S. Cl.
    CPC ...... B29D 30/0685 (2013.01); B05B 13/0645 (2013.01); B60B 30/04 (2013.01);
    (Continued)

(58) Field of Classification Search
    USPC ....... 118/62, 63, 66, 69, 712, 666, 667, 306, 118/317, 318, 686, 688
    See application file for complete search history.

(56) References Cited

U.S. PATENT DOCUMENTS 4,294,730 A 10/1981 Kenney
4,539,344 A 9/1985 Van Ornum et al.
(Continued)

FOREIGN PATENT DOCUMENTS

CN 104959259 A * 10/2015 ......... B05B 13/0645
CN 108080216 5/2018
(Continued)

OTHER PUBLICATIONS

English Translation CN-104959259-A (Year: 2015).*
(Continued)

*Primary Examiner* — Yewebdar T Tadesse
(74) *Attorney, Agent, or Firm* — HSML P.C.

(57) ABSTRACT

The present disclosure relates to a process and a system for manufacturing an HSST tyre, as well as the HSST tyre manufactured by the same. The process for manufacturing an HSST tyre includes a cleaning step, a spraying step, and a forced-cooling step. The cleaning step includes an air-drying procedure for evaporating the isopropanol solution on the tyre to be treated with air-drying gases. The forced-cooling step is configured to forcibly cool the tyre to be treated that has been sprayed with the high molecular organic material. By means of accurate design for each step and procedure, the relying on operator's experience is eliminated and thus the performance stability of the HSST tyre is guaranteed. By means of the air-cooling procedure and the forced-cooling step, the time taken to manufacture an HSST tyre is substantially shortened, making it possible to produce the HSST tyre in a large scale.

13 Claims, 4 Drawing Sheets

(51) Int. Cl.

| | | |
|---|---|---|
| B60B 30/04 | (2006.01) |
| B60C 1/00 | (2006.01) |
| B60C 19/12 | (2006.01) |

(52) U.S. Cl.

CPC ................ B60C 1/00 (2013.01); B60C 19/12 (2013.01); *B29D 2030/0697* (2013.01)

(56) References Cited

U.S. PATENT DOCUMENTS

| | | |
|---|---|---|
| 2004/0020575 A1 | 2/2004 | Zanzig et al. |
| 2010/0218883 A1 | 9/2010 | Naito |
| 2012/0277335 A1 | 11/2012 | Liu |
| 2017/0080655 A1 | 3/2017 | Barjon et al. |
| 2017/0250633 A1 | 8/2017 | Moiraghi et al. |
| 2018/0200977 A1 | 7/2018 | Yukawa et al. |

FOREIGN PATENT DOCUMENTS

| | | | | | |
|---|---|---|---|---|---|
| CN | 207941648 | U | | 10/2018 | |
| CN | 109094071 | | | 12/2018 | |
| CN | 109094071 | A | * | 12/2018 | ......... B29D 30/0685 |
| CN | 109353044 | | | 2/2019 | |
| CN | 109367084 | | | 2/2019 | |
| CN | 109825161 | | | 5/2019 | |
| CN | 110356028 | | | 10/2019 | |
| EP | 3009473 | A1 | | 4/2016 | |
| JP | 852116507 | | | 9/1977 | |
| JP | S915442 | | | 1/1984 | |
| JP | H11320564 | A | * | 11/1999 | |
| JP | 3932440 | B2 | * | 6/2007 | |
| JP | 2014513733 | | | 6/2014 | |
| JP | 2016078232 | | | 5/2016 | |
| JP | 2017531274 | | | 10/2017 | |
| KR | 970025895 | A | * | 6/1997 | |
| WO | 2009014082 | | | 1/2009 | |
| WO | WO-2014078421 | A2 | * | 5/2014 | ........... B60C 99/003 |
| WO | WO-2016099818 | A1 | * | 6/2016 | ......... B05B 13/0645 |

OTHER PUBLICATIONS

English Translation CN-108080216A (Year: 2018).*
English Translation CN-109367084A (Year: 2019).*
English Translation CN-109825161A (Year: 2019).*
English Translation CN-207941648U (Year: 2018).*
English Translation JP-2014513733A (Year: 2014).*
English Translation JP-2017531274A (Year: 2017).*
English Translation JP-3932440B2 (Year: 2007).*
English Translation KR-970025895 (Year: 1997).*
English Translation CN-10-094071 (Year: 2018).*
English Translation JP-H11320564A (Year: 1999).*
1 Extended European Search Report, European Patent Application No. 20912458.5, Jan. 17, 2024 (7 pages).
International Search Report issued for International Patent Application No. PCT/JP2020/033763, Date of mailing: Nov. 10, 2020, 8 pages including English translation.

* cited by examiner

PROCESS AND A SYSTEM FOR MANUFACTURING A HIGH SELF-SEALING TYRE, AND A HIGH SELF-SEALING TYRE MANUFACTURED BY THE SAME

TECHNICAL FIELD

The present disclosure relates generally to the field of manufacture of tyres. More specifically, the present disclosure relates to a process and a system for manufacturing a high self-sealing tyre (HSST tyre), as well as the HSST tyre manufactured by the same.

RELEVANT ART

Tyres are important components of various vehicles. In use, a tyre directly contacts the road surface, withstands and absorbs the shock and vibration arising from the traveling of the vehicle, and ensures the vehicle to have a superior riding comfort and a favorable running smoothness. However, as the tyre is in direct contact with the ground, it may often be punctured by sharp objects (for example, nails, glass cullet and the like) on the road surface, resulting in air leakage, tyre burst, etc., which severely reduces the driving safety of vehicles.

In order to avoid these problems, various tyres such as explosion-proof tyres, puncture-proof tyres sprayed with hot-melt adhesives, and the like have been developed. The explosion-proof tyres, also known as run-flat tyres, are tyres capable of supporting the vehicle by tyre walls after the air in the tyres have been leaked, so as to allow the vehicle to continue running a distance.

The tyre walls of the explosion-proof tyres are thickened and reinforced, resulting in that the explosion-proof tyres are slightly hard, and thus reducing the ability of the tyres to absorb the impacts and vibrations and reducing the riding comfort of the vehicle.

The puncture-proof tyres sprayed with hot-melt adhesives have broad market prospects. When such tyres are punctured by sharp objects, the hot-melt adhesive layer thereon may close the openings punctured in the tyres, so the air may hardly or rarely escape from the tyres, avoiding the occurrence of possible accidents.

However, the current process for manufacturing such tyres (for example, the process for spraying hot-melt adhesives) is relatively backward. On one hand, the current process is not highly automated, in particular, the spraying operation requires deep intervention of operators and thus excessively depends on the experience of operators, resulting in insufficient operation precision and making it difficult to guarantee the spraying quality.

On the other hand, the current process requires a long cooling time in the spraying operation, resulting in that it takes a very long time to obtain a finished tyre, and resulting in that it is difficult to manufacture such tyres in a large-scale.

Therefore, there is a demand for improving the prior art process and system.

SUMMARY OF THE INVENTION

In a first aspect of the present disclosure, a process for manufacturing an HSST tyre is provided. The process may include: a cleaning step for cleaning a tyre to be treated to remove impurities on an inner liner of the tyre to be treated; a spraying step for spraying the heated high molecular organic material on the inner liner of the tyre to be treated;

and a forced-cooling step for forcibly cooling the tyre to be treated that has been sprayed with the high molecular organic material.

The cleaning step includes: a soaking procedure, in which the tyre to be treated is soaked in an alcohols solution or a graphitic solution for 10 seconds; a scrubbing procedure, in which the inner liner of the tyre to be treated is scrubbed for 30 seconds; a sprinkling procedure, in which the alcohols solution or a graphitic solution is sprinkled onto the tyre to be treated that has been scrubbed to rinse inner and outer sides of the tyre to be treated; an upright rotating procedure, in which the tyre to be treated that has been rinsed is brought into an upright rotating state at a rotational speed of 300 rpm; an air-drying procedure, in which the alcohols solution or a graphitic solution on the tyre to be treated is evaporated with air-drying gases with the tyre to be treated being maintained in the upright rotating state at the rotational speed of 300 rpm, wherein the air-drying procedure lasts for 3 minutes.

The spraying step includes: a tyre-accelerating procedure, in which the tyre to be treated is maintained in the upright rotating state and the rotational speed is accelerated to 500 rpm; a spraying procedure, in which the heated high molecular organic material is sprayed onto the inner liner of the tyre to be treated in an amount of 2.5 kg/min so as to form on the inner liner of the tyre a layer of high molecular organic material having self-sealing functions, the heated high molecular organic material being at a temperature ranging from 220° C. to 230° C.; and a centrifugal-rotation-maintaining procedure, in which the tyre to be treated is kept in an upright rotating state at a rotational speed of 500 rpm after the spraying is stopped until the temperature of the high molecular organic material is cooled down to 140° C. naturally, so as to enhance the adhesive and the uniformity of the layer of high molecular organic material.

In the forced-cooling step, the temperature of the layer of high molecular organic material on the inner liner of the tyre to be treated is cooled to 60° C. within 3 minutes by using cooling gases, thereby forming the HSST tyre.

According to an embodiment of the present disclosure, in the forced-cooling step, the tyre to be treated is maintained in an upright rotating state at a rotational speed of 500 rpm.

According to an embodiment of the present disclosure, in the forced-cooling step, the cooling gases are ejected onto the inner liner of the tyre to be treated at an ejection velocity of 3000 m³/h.

According to an embodiment of the present disclosure, in the forced-cooling step, the ejection velocity of the cooling gases is adjusted according to a cooling rate of the layer of high molecular organic material on the inner liner of the tyre to be treated.

According to an embodiment of the present disclosure, in the air-drying procedure of the cleaning step, the air-drying gases are fed at a feeding speed of 3000 m³/h.

According to an embodiment of the present disclosure, in the air-drying procedure of the cleaning step, waste gases generated in the air-drying procedure are sucked at a suction speed of 3000 m³/h.

According to an embodiment of the present disclosure, the waste gases generated in the air-drying procedure are treated to meet the emission standards.

According to an embodiment of the present disclosure, the temperature of the air-drying gases is heated to about 40° C. According to an embodiment of the present disclosure, the air-drying gases are air.

According to an embodiment of the present disclosure, the air-drying gases are forced to form a uniform convection by at least one gas circulation mechanism.

According to an embodiment of the present disclosure, the cooling gases are air.

According to an embodiment of the present disclosure, the process for manufacturing the HSST further comprises a heating step for heating the high molecular organic material ready for spraying to a use temperature between 220° C. and 230° C.

According to an embodiment of the present disclosure, the heating step is performed concurrently with the cleaning step, the spraying step and the forced-cooling step.

According to an embodiment of the present disclosure, the heating step includes: a preheating procedure, in which the high molecular organic material previously fed in a heating furnace is heated to 220° C., an amount of the high molecular organic material previously fed being 80% of a volume of the heating furnace; a feeding procedure, in which the high molecular organic material in the form of cube-shaped blocks is fed in the heating furnace at a predetermined speed; and a heating procedure performed concurrently with the feeding procedure, in which the temperature inside the heating furnace is maintained between 225° C. and 240° C.

According to an embodiment of the present disclosure, the heating step further includes a delivering procedure for delivering the melted high molecular organic material, wherein in the delivering procedure, the melted high molecular organic material is heated and maintained at the use temperature.

According to an embodiment of the present disclosure, the delivering procedure is performed concurrently with the feeding procedure and the heating procedure.

According to an embodiment of the present disclosure, the high molecular organic material comprises 30~32% of synthetic rubber, 30~32% of petroleum resin, 15~18% of naphthenic oil, 18% of softner, and 2% of antioxidant.

According to an embodiment of the present disclosure, the alcohols solution is an isopropanol solution.

According to an embodiment of the present disclosure, the high molecular organic material is sprayed on the inner liner of the tyre to be treated in a range of tread width of the tyre to be treated.

According to an embodiment of the present disclosure, a thickness of the layer of the high molecular organic material is 0.6 cm.

According to a second aspect of the present disclosure, a system for manufacturing an HSST is provided. The system may include: a cleaning station for cleaning a tyre to be treated to remove impurities on an inner liner of the tyre to be treated; a spraying station for spraying the heated high molecular organic material on the inner liner of the tyre to be treated; and a forced-cooling station for forcibly cooling the tyre to be treated that has been sprayed with the high molecular organic material.

The cleaning station comprises: a soaking tank containing an alcohols solution or a graphitic solution for soaking the tyre to be treated; a scrubbing device for scrubbing the inner liner of the tyre to be treated, the scrubbing device including a brush for performing the scrubbing operation; a sprinkling device including a sprinkler head for sprinkling the alcohols solution or a graphitic solution onto the tyre to be treated that has been scrubbed o rinse inner and outer sides of the tyre to be treated; a tyre upright-rotating device comprising two spaced-apart rotatable rollers configured to rotate the tyre to be treated by friction between a surface of the tyre to be treated and the rotatable rollers; and an air chamber for evaporating the alcohols solution or a graphitic solution on the tyre to be treated with air-drying gases, an inlet end of the air chamber being provided with an air inlet for supplying the air-drying gases into the air chamber, and an outlet end of the air chamber being provided with an air outlet for discharging waste gases from the air chamber.

The spraying station includes: a tyre accelerating-and-maintaining device configured to accelerate the tyre to be treated to a predetermined rotational speed and maintain the tyre to be treated at the predetermined rotational speed; and a spraying device for spraying the heated high molecular organic material onto the inner liner of the tyre to be treated to form thereon a layer of high molecular organic material having self-sealing functions, the spraying device comprising a nozzle, and a delivery pipe connected to the nozzle for delivering the heated high molecular organic material to the nozzle.

The forced-cooling station includes: an air-cooling device for ejecting cooling gases to perform forced cooling, the air-cooling device including a body provided with a plurality of air outlets and a delivery pipe connected to the body; and a real-time temperature detecting device for detecting the real-time temperature on the inner liner of the tyre to be treated.

According to an embodiment of the present disclosure, the scrubbing device is provided on a scrubbing platform, and a lifting device is provided on a side of the scrubbing platform for lifting and lowering the tyre to be treated and thus automatically loading and unloading the tyre to be treated.

According to an embodiment of the present disclosure, the lifting device comprises a receiving component for receiving the tyre to be treated and a driving component for driving the receiving component.

According to an embodiment of the present disclosure, the receiving component is configured as a plate comprising a plurality of sections which could be folded to a certain degree relative to each other, so as to receive and hold the tyre to be treated.

According to an embodiment of the present disclosure, the driving component is configured as a hydraulic cylinder or a pneumatic cylinder having an extensible shaft.

According to an embodiment of the present disclosure, the scrubbing platform is provided with a tyre-holding device comprising a blocking mechanism to constrain the tyre to be treated in four locations of an upper side, a lower side, a left side and a right side.

According to an embodiment of the present disclosure, the blocking mechanism comprises a plurality of extensible posts.

According to an embodiment of the present disclosure, the brush of the scrubbing device is configured to be movable in a width direction of the tyre to be treated.

According to an embodiment of the present disclosure, the sprinkler head of the sprinkling device is configured to be movable in a vertical direction and a horizontal direction. According to an embodiment of the present disclosure, the scrubbing device is configured integrally with the sprinkling device.

According to an embodiment of the present disclosure, the brush of the scrubbing device and the sprinkler head of the sprinkling device are mounted on the same movable support.

According to an embodiment of the present disclosure, the air chamber is further provided therein with an upright rotation-maintaining mechanism comprising two spaced-apart rotatable rollers and a blocking mechanism disposed under the rotatable rollers, the blocking mechanism including a body and at least one extendable post disposed on the body.

According to an embodiment of the present disclosure, the cleaning station is provided with a heater to heat the air-drying gases.

According to an embodiment of the present disclosure, the heater is a temperature-controlled heater.

According to an embodiment of the present disclosure, the nozzle of the spraying device is configured to be movable in the horizontal direction and the vertical direction.

According to an embodiment of the present disclosure, the nozzle of the spraying device is configured to spray the high molecular organic material on the inner liner of the tyre to be treated in a range of tread width of the tyre to be treated.

According to an embodiment of the present disclosure, the air-cooling device is fixed to a robot and is movable along with the robot.

According to an embodiment of the present disclosure, the body of the air-cooling device is configured to be rotational such that the cooling gases can be rotationally ejected.

According to an embodiment of the present disclosure, the forced-cooling station includes a conveying device so that the tyre to be treated is conveyed towards the outlet of the forced-cooling station while being subjected to forced cooling.

According to an embodiment of the present disclosure, the forced-cooling station includes a control device that adjusts a conveying speed of the conveying device and/or an air output of the air-cooling device based on real-time temperatures detected by the real-time temperature detection device, so that the tyre to be treated that has been sprayed with the high molecular organic material is cooled at a stable rate.

According to an embodiment of the present disclosure, the real-time temperature detection device is configured as an infrared temperature sensing device.

According to an embodiment of the present disclosure, the system for manufacturing the HSST further comprises a heating station for heating the high molecular organic material ready for spraying to a use temperature. The heating station includes: a heating furnace including a heating device and a stirring device; and a delivery pipe for delivering the melted high molecular organic material to the spraying device, wherein temperature sensors and heaters are provided at different locations of the delivery pipe to maintain the high molecular organic material at the use temperature.

BENEFIT OF INVENTION

In a third aspect of the present disclosure, an HSST tyre is provided. The HSST is manufactured with the process for manufacturing an HSST tyre according to the present disclosure.

BRIEF DESCRIPTION OF THE DRAWINGS

The above-mentioned features as well as the manner in which they are disclosed will become more apparent with reference to the following detailed description of specific embodiments of the present disclosure in conjunction with the drawings, wherein:

6

Figure 1:
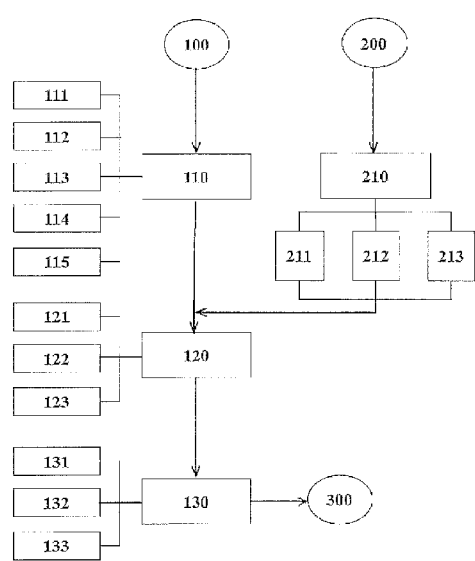

FIG. 1 is a schematic flow chart of a process for manufacturing HSST according to an embodiment of the present disclosure.

Figure 2:
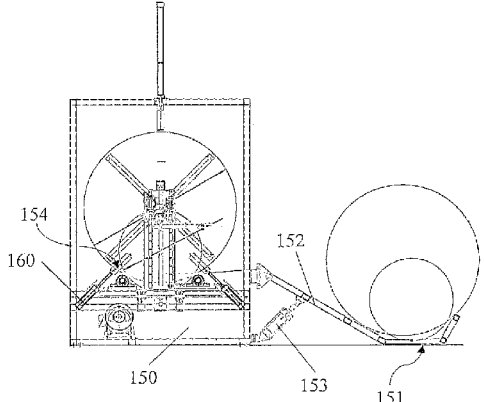

FIG. 2 schematically illustrates a scrubbing platform and a lifter device according to an embodiment of the present disclosure.

Figure 3:
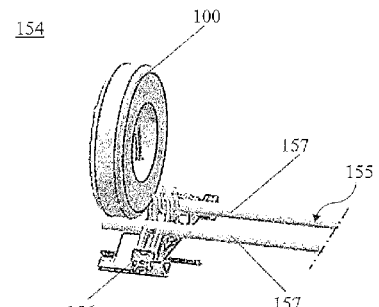

FIG. 3 schematically illustrates a tyre-holding device according to an embodiment of the present disclosure.

Figure 4:
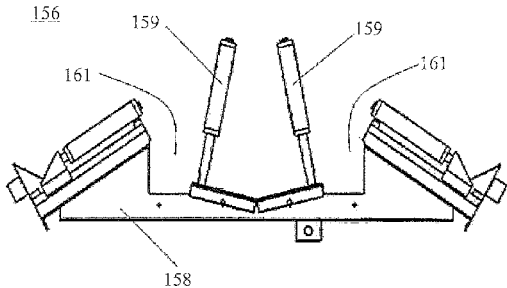

FIG. 4 schematically illustrates a blocking mechanism according to an embodiment of the present disclosure.

Figure 5:
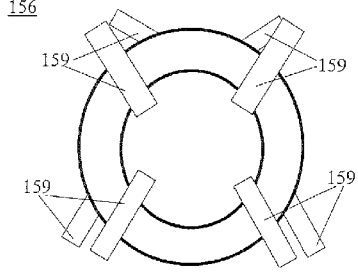

FIG. 5 schematically illustrates a blocking mechanism according to another embodiment of the present disclosure.

Figure 6:
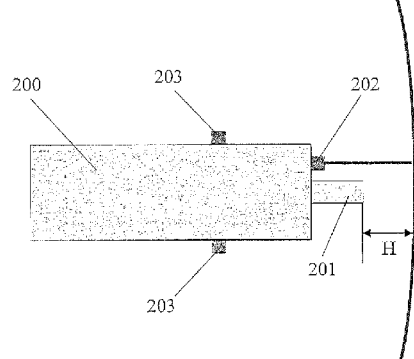

FIG. 6 schematically illustrates a spraying device according to an embodiment of the present disclosure.

Figure 7:
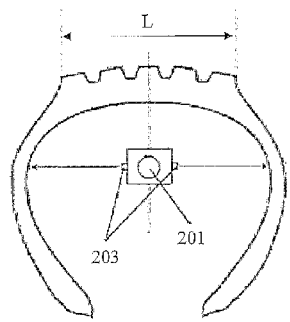

FIG. 7 schematically illustrates a spraying device according to an embodiment of the present disclosure.

Figure 8:
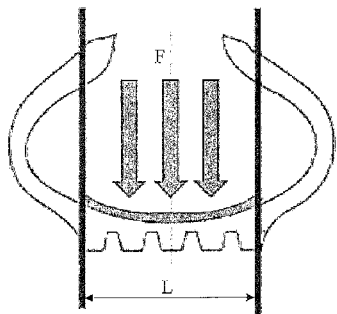

FIG. 8 schematically illustrates stress states of the high molecular organic material sprayed on the tyre during the rotation of the tyre.

Figure 9:
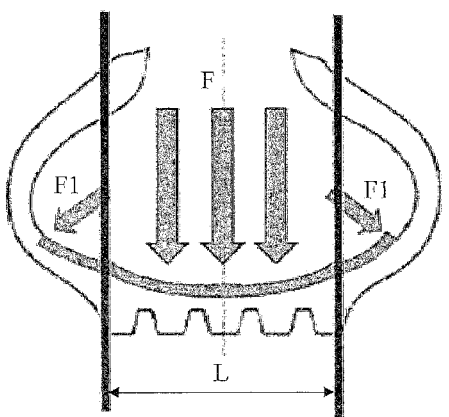

FIG. 9 schematically illustrates stress states of the high molecular organic material sprayed on the tyre during the rotation of the tyre.

Figure 10:
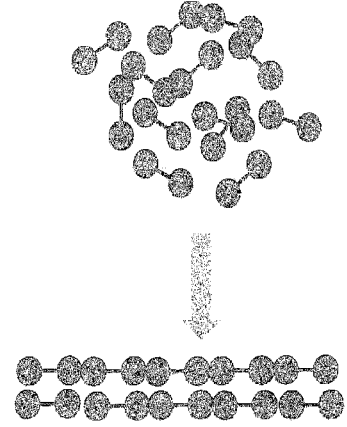

FIG. 10 schematically illustrates the change of state of the high molecular organic material.

DETAILED DESCRIPTION

The present disclosure will be described below with reference to the drawings, in which several embodiments of the present disclosure are shown. It should be understood, however, that the present invention may be implemented in many different ways and is not limited to the example embodiments described below. In fact, the embodiments described hereinafter are intended to make a more complete disclosure of the present invention and to adequately explain the protection scope of the present invention to a person skilled in the art. It should also be understood that, the embodiments disclosed herein can be combined in various ways to provide many additional embodiments.

It should be understood that, the wording in the specification is only used for describing particular embodiments and is not intended to limit the present invention.

All the terms used in the specification (including technical and scientific terms) have the meanings as normally understood by a person skilled in the art, unless otherwise defined.

For the sake of conciseness and/or clarity, well-known functions or constructions may not be described in detail. The singular forms "a/an" and "the" as used in the specification, unless clearly indicated, all contain the plural forms. The words "comprising", "containing" and "including" used in the specification indicate the presence of the claimed features, but do not preclude the presence of one or more additional features.

The applicant has developed a high self-sealing tyre (also called "HSST tyre"), in which a self-sealing layer having memory function is formed evenly on a tread portion of the tyre using an intelligent composite material. This self-sealing layer has active self-sealing properties. When the HSST tyre is punctured by sharp objects, the intelligent composite material at the punctured position in the self-sealing layer may be reorganized immediately at the moment of extracting the sharp objects, resulting in the self-sealing of the tyre and thus ensuring that no air escapes from the tyre.

The self-sealing layer in the HSST tyre developed by the applicant forms an active pneumatic protection system, which guarantees the driving safety of vehicles equipped with such HSST tyres. The HSST tyre can withstand the piercing of a sharp object with a diameter less than or equal to 6 mm without secondary repair, and the intelligent composite material forming the self-sealing layer is not liquefied and does not flow and thus has a stable performance at temperature ranging from −35° C. to 120° C. Further, the intelligent composite material and the self-sealing layer formed thereby can effectively block acoustic waves from the ground and reduce noises, making it more comfortable to drive the vehicle equipped with the HSST tyres.

In order to achieve large-scale production of the HSST tyre as described above and guarantee the production quality, the applicant has further developed a process for manufacturing the HSST tyre and a system for carrying out such a process.

The process and the system substantially achieve the automation of all procedures without deep intervention of operators and thus without relying on the experience of the operators.

By accurately designing and controlling each step and procedure of the process, the process and the system may not only substantially shorten the time for manufacturing the HSST tyre, but also may guarantee the performance stability and consistency of the manufactured HSST tyre, thus making it possible to produce the HSST tyre in a large scale.

Referring to FIG. 1, a process for manufacturing an HSST tyre according to the present disclosure and a system for carrying out the process will be described. It should be noted that the process for manufacturing the HSST tyre according to the present disclosure mainly focuses on the step of spraying and curing an intelligent composite material on inner liners of a tyre to be treated to form the HSST tyre.

In an embodiment of the present disclosure, the intelligent composite material is a high molecular organic material. The high molecular organic material may comprise 30~32% of synthetic rubber, 30~32% of petroleum resin, 15-18% of naphthenic oil, 18% of softner, and 2% of antioxidant.

The components of the high molecular organic material are chosen to achieve the following relationship between the flowability (viscosity) and the temperature of the high molecular organic material: the high molecular organic material is generally stagnant when the temperature is less than 80° C.; the Engler viscosity of the high molecular organic material is between 100~140 when the temperature is between 120° C.~160° C.; and the Engler viscosity of the high molecular organic material is about 50 when the temperature is more than 160° C.

As shown in FIG. 1, the process for manufacturing the HSST tyre according to the present disclosure may include a cleaning step 110, a spraying step 120, and a forced-cooling step 130.

The cleaning step 110 will be described at first. A tyre 100 to be treated needs to be cleaned, so as to remove impurities such as oily release agent, glue, dust and the like remaining on an inner liner of the tyre 100. The main component of the oily release agent is organosilicon. If the organosilicon is not completely removed from the inner liner of the tyre, it may form an isolating layer on the inner liner and thus may make the high molecular organic material hard to adhere on the surface of the inner liner.

Therefore, the cleaning step 110 is one of key steps that determine whether the high molecular organic material can be uniformly and firmly affixed to the inner liner of the tyre 100 and thus determine the performance stability of the final HSST tyre.

In an embodiment of the present disclosure, the alcohols solution or the graphitic solution may be used for the cleaning.

The alcohols solution may be an isopropanol solution, and the like.

The alcohols solution or the graphitic solution could break the silicon-oxygen bond (Si—O) in the oily release agent, make the oily release agent fall off from the inner liner of the tyre in a film form, and thus expose the rubber polymer surface of the inner liner of the tyre, so as to facilitate the easy adhesion of the intelligent composite material according to the present disclosure on the rubber polymer surface of the inner liner of the tyre.

In an embodiment of the present disclosure, the cleaning step 110 may include the following procedures: a soaking procedure 111, a scrubbing procedure 112, a sprinkling procedure 113, an upright rotating procedure 114, and an air-drying procedure 115.

All the procedures of the cleaning step 110 may be carried out in a cleaning station of the system for manufacturing the HSST tyre according to the present disclosure, which will be described in detail below.

In the soaking procedure 111, both the inner and outer sides of the tyre 100 are soaked in the alcohols solution or the graphitic solution for 10 seconds, so as to remove the oily release agent remaining on the inner liner of the tyre 100.

The soaking procedure 111 is carried out in a soaking tank provided in the cleaning station. The tyre 100 is conveyed into the soaking tank using an automatic conveying device disposed in front of the soaking tank.

The automatic conveying device may be configured to be of any suitable type. For example, the automatic conveying device may be an endless conveyor belt, the rear portion of which may be disposed above the soaking tank. When to be conveyed, the tyre 100 may be placed directly on the conveyor belt.

The automatic conveying device may also be a chain conveyor, which may include endless chains disposed on left and right sides of the conveyor and optionally a flexible support surface between the endless chains. When to be conveyed, the tyre 100 may ride on the endless chains of the left and right sides or be placed on the flexible support surface (if present).

The automatic conveying device may be driven by any suitable motors, such as a stepper motor and the like.

Following the soaking procedure 111, the scrubbing procedure 112 is performed. After the tyre 100 has been kept in the soaking tank for 10 seconds, the tyre 100 is taken out of the soaking tank with a robot and is then conveyed to a scrubbing device disposed in the cleaning station with an automatic convey device to scrub the inner liner of the tyre 100, so as to continue to remove the impurities such as oily release agent, dust and the like remaining on the inner liner of the tyre 100. The scrubbing procedure 112 may last for thirty seconds.

As shown in FIG. 2, the scrubbing device is provided on a scrubbing platform 150 with a height from the ground. In order to convey the tyre 100 to the scrubbing device on the scrubbing platform 150 automatically, a lifting device 151 may be provide at a side of the scrubbing platform 150 for lifting and lowering the tyre and thus for loading and unloading the tyre automatically.

The lifting device 151 may comprise a receiving component 152 for receiving the tyre and a driving component 153 for driving the receiving component 152. One end of the receiving component 152 is hinged to a frame of the scrubbing platform 150 at a height from the ground, and the other end of the receiving component 152 may contact the ground and may be lifted or lowered under the action of the driving component 153, so as to load or unload the tyre. In an embodiment of the present disclosure, the receiving component 152 may be configured as a plate.

The plate may be consisted of a plurality of sections which could be folded to a certain degree relative to each other, so as to receive and hold the tyre. For example, when receiving the tyre, one section of the plate that contacts with the ground may be laid flat on the ground, so that the tyre may be moved to the plate easily; and when the tyre has been moved to the plate, the section of the plate that contacts with the ground may be folded to a certain degree to forma recess for receiving and holding the tyre (as shown in FIG. 2), which could prevent the tyre from falling in the process of lifting and lowering.

In an embodiment of the present disclosure, the driving component 153 may be configured to have an extensible shaft (such as in the form of a hydraulic cylinder or a pneumatic cylinder).

One end of the driving component 153 is hinged to the frame of the scrubbing platform 150 in a location close to the ground, and the other end of the driving component 153 is hinged to the receiving component 152 in a location far away from both ends of the receiving component 152.

Thus, when the shaft of the driving component 153 is extended, the receiving component 152 could be lifted to load the tyre onto the scrubbing platform 150; and when the shaft of the driving component 153 is retracted, the receiving component 152 could be lowered to unload the tyre from the scrubbing platform 150. The driving component 153 could also be configured to have any other suitable form.

A tyre-holding device 154 may also be provide on the scrubbing platform 150. The tyre-holding device 154 is configured to prevent the tyre 100 from bouncing or falling down while maintaining the rotation of the tyre 100. The tyre-holding device 154 may comprise a driving mechanism 155 for driving the tyre into rotation and a blocking mechanism 156 for preventing the tyre from bouncing or falling down.

As shown in FIG. 3, the driving mechanism 155 may comprise two spaced-apart rotatable rollers 157. The tyre 100 may be positioned on the rotatable rollers 157 uprightly and could be rotated by the rotatable rollers 157.

The blocking mechanism 156 could be provided on the both sides of the tyre 100 (only the blocking mechanism 156 positioned on the right side of the tyre 100 is shown in FIG. 3) to prevent the tyre 100 from bouncing or falling down.

As shown in FIG. 4, The blocking mechanism 156 may comprise a body 158 and at least one extensible post 159 provided on the body 158. The extensible post 159 may move between an extended configuration in which the extensible post 159 could stop and prevent the tyre 100 from bouncing in a direction along the length of the rotatable roller 157 or falling down and a retracted configuration in which the extensible post 159 does not stop the tyre 100 and thus the tyre 100 could move in the direction along the length of the rotatable roller 157.

The extensible post 159 could be driven by a hydraulic cylinder or a pneumatic cylinder 160 (as shown in FIG. 2).

A portion of the extensible post 159 that contacts with the tyre 100 may be configured to be rotatable around a central axis of the extensible post, so that the friction force between the tyre and the extensible post 159 may be reduced during the rotation of the tyre 100.

The blocking mechanism 156 may be arranged under the rotatable roller 157. In this situation, the blocking mechanism 156 may be provide with a recess 161 through which the rotatable roller 157 extends.

As shown in FIG. 5, in an embodiment of the present disclosure, the blocking mechanism 156 is configured to comprise a plurality of extensible posts 159. The plurality of extensible posts 159 may constrain the tyre 100 from four locations of an upper side, a lower side, a left side and a right side, which could limit the bouncing of the tyre in the left to right direction and in the up to down direction. This is particularly beneficial for a tyre with a bad roundness or a tyre with a poor homogeneity due to the tread wear.

Since the blocking mechanism 156 with such a configuration could avoid the bouncing in the left to right direction and in the up to down direction caused by the defects of the tyre itself, the consistency and the accuracy of the scrubbing procedure as well as the subsequent spraying procedure could be guaranteed.

The scrubbing device may include a brush for performing a scrubbing operation. The brush performs the scrubbing operation with the tyre 100 rotating, so that the whole inner surface the tyre 100 could be scrubbed.

The brush may be configured to be automatically moved in a width direction of the tyre (i.e., in an axial direction), so that the inner liner of the tyre 100 may be scrubbed by the brush along the entire width of the tyre 100. In an embodiment of the present disclosure, the brush may be mounted on a movable support, such as a support rod. The movement of the support rod may be controlled by a control device, so as to drive the brush to be moved. The brush may also be configured to be rotatable about its own central axis to facilitate the scrubbing. The bristles of the brush may be made of nylon.

Following the scrubbing procedure 112, the sprinkling procedure 113 is performed. The sprinkling procedure 113 is configured to sprinkle the alcohols solution or the graphitic solution onto the tyre 100 that has been scrubbed, so as to rinse the inner and outer sides of the tyre 100.

The sprinkling procedure 113 is performed with a sprinkler head. The sprinkler head may be configured to be movable in a vertical direction and a horizontal direction, so as to sprinkle the inner and outer sides of the entire tyre 100. Like the brush, the sprinkler head may also be mounted on a movable support such as a support rod. The movement of the support may be controlled by a control device to drive the sprinkler head to move in the vertical and horizontal directions.

The sprinkler head may be configured to be disposed on a separate sprinkling device or may be configured to be disposed on the aforementioned scrubbing device.

In the embodiment where the sprinkler head is configured to be disposed on the scrubbing device, the brush and the sprinkler head may be mounted on the same support and the movement of the brush and sprinkler head may be controlled with the same control device.

In addition, it is also possible to integrate the brush and the sprinkler head in a single component such that this single component has double functions of scrubbing and sprinkling. Such configurations may simplify the system according to the present disclosure. However, the present disclosure is not limited thereto, and the brush and the sprinkler head may be mounted on different supports and controlled separately with different control devices, which may endow the system according to the present disclosure with greater flexibility.

Following the sprinkling procedure 113, the upright rotating procedure 114 is performed. The upright rotating procedure 114 is configured to bring the tyre 100 into an upright rotating state at a rotational speed of 300 rpm. The upright rotating procedure 114 may be performed on a tyre uprightly-rotating device. The tyre 100 may be transferred from a previous device to the tyre uprightly-rotating device using a robot.

The tyre uprightly-rotating device may be configured to include two spaced-apart rotatable rollers. The tyre 100 is erected between the two spaced-apart rotatable rollers and is brought into rotation by the latter via a friction between the surface of the tyre and the rotatable rollers.

A conveyor belt may be placed below the rotatable rollers. The conveyor belt may be configured to move along a length direction of the rotatable rollers, such that the tyre 100, while being kept in rotation, can be moved along the length direction of the rotatable rollers and be further conveyed into the air chamber for the next air-drying procedure 115.

Specifically, the conveyor belt may be configured to be in contact with a bottom portion of the tyre 100 to generate a frictional force, by which the tyre 100 is moved along the length direction of the rotatable rollers while being kept rotated.

The rotational speed of the rotatable rollers and the speed of movement of the conveyor belt may be adjusted by a control device, such that the tyre 100 may reach a rotational speed of about 300 rpm when conveyed to the inlet of the air chamber. This may save and optimize the duration of the whole process.

After the tyre 100 is conveyed into the air chamber, the air-drying procedure 105 is performed. The air-drying procedure 105 is configured to evaporate the alcohols solution or the graphitic solution on the tyre 100.

An inlet end of the air chamber is provided with an air inlet for feeding air-drying gases into the air chamber, and an outlet end of the air chamber is provided with an air outlet for discharging waste gases from the air chamber.

In an embodiment of the present disclosure, the air-drying gases are fed into the air chamber at a speed of 3000 m³/h via the air inlet.

This may be done using a suitable source of pressurized gas or a suitable pumping mechanism. The air-drying gases may be air or any other suitable gases. A heater may be provided to heat the air-drying gases. The heater is configured to heat the air-drying gases to about 40° C. prior to being fed to the air chamber, so as to accelerate the air-drying procedure of the tyre 100. The heater may be a temperature-controlled heater.

In order to form a uniform convection of the air-drying gases in the air chamber, a gas circulation mechanism for promoting circulation of the air-drying gases may be provided in the air chamber. The gas circulation mechanism may be configured to be of any suitable type. For example, the gas circulation mechanism may be configured to a circulating fan. In an embodiment of the present disclosure, a plurality of gas circulation mechanisms may be disposed in the air chamber. For example, there may be one gas circulation mechanism every 10 meters.

The waste gases may be withdrawn from the air chamber via the air outlet at a speed of 3000 m³/h with a suction mechanism. As the isopropanol solution which is a flammable organic substance is used in both soaking procedure 111 and the sprinkling procedure 113, the waste gases withdrawn from the air chamber shall be introduced into a waste gas recovery device for treatment, such that the waste gases may meet relevant emission standards.

In a preferred embodiment of the present disclosure, while the air-drying procedure 115 is performed in the air chamber, the tyre 100 is still kept in the upright rotating state at a rotational speed of 300 rpm. An upright rotation-maintaining mechanism for maintaining the tyre 100 in the upright rotation station, which is similar to the tyre-holding device 154, may be provided in the air chamber.

In an embodiment of the present disclosure, thorough drying of the tyre 100 may be fulfilled in the air chamber within 3 minutes. On the contrary, it will take about 20 minutes to air-dry the tyre by conventional methods. Therefore, the air-drying procedure 115 according to the present disclosure substantially reduces the time taken to air-dry the tyre 100, and thus significantly improves the production efficiency.

The tyre 100 that has been air-dried is conveyed to a spraying station of the system for manufacturing the HSST tyre according to the present disclosure to implement the spraying step 120, such that the heated high molecular organic material may be sprayed on the inner liner of the tyre 100.

The spraying step 120 may include the following procedures: a tyre-accelerating procedure 121, a spraying procedure 122, and a centrifugal-rotation-maintaining procedure 123.

In the tyre-accelerating procedure 121, the tyre 100 is accelerated to reach and be kept at a rotational speed of 500 rpm. This aims to create a sufficient centrifugal force in the tyre 100, such that the sprayed high molecular organic material can be evenly spread over the inner liner of the tyre. The tyre-accelerating procedure 121 may be implemented with a tyre accelerating-and-maintaining device.

The tyre accelerating-and-maintaining device may be configured as a rotatable roller like the rotatable rollers 157. A control device may be used to adjust the rotational speed of the tyre accelerating-and-maintaining device and, after the tyre 100 is accelerated to a rotational speed of 500 rpm, maintain the tyre 100 at this speed.

After the tyre 100 reaches the rotational speed of 500 rpm, the rotational speed is maintained and the spraying procedure 122 is performed to spray the heated high molecular organic material on the inner liner of the tyre.

When performing the spraying procedure 122, the high molecular organic material has been heated to a temperature higher than 180° C., and preferably between 220° C.~230° C. The applicant finds in practice that, by heating the high molecular organic material to a temperature higher than 180° C. and preferably between 220° C.~230° C., the Engler viscosity of the high molecular organic material could be maintained around 50.

In this situation, the high molecular organic material could be sprayed evenly on the inner liner of the tyre by rotating the tyre 100 rapidly, and thus an even and smooth layer of the high molecular organic material is formed. In an embodiment of the present disclosure, the high molecular organic material is sprayed with an amount of 2.5 kilogram per minute. The thickness of the layer of the high molecular organic material is controlled in 0.6 centimeter.

The spraying procedure 122 is implemented with a spraying device 200. The spraying device 200 may be configured to include a nozzle 201 and a delivery pipe connected to the nozzle. The delivery pipe is adapted to deliver the heated high molecular organic material to the nozzle so that the high molecular organic material may be ejected through the nozzle.

The delivery pipe may be configured as a flexible delivery pipe. The nozzle may be configured to be movable in the horizontal direction and the vertical direction. For example, the nozzle may be mounted on a movable support, such as a support rod, for movement therewith.

As shown in FIGS. 6 and 7, in an embodiment of the present disclosure, the nozzle 201 carries out a spraying operation at a height above the inner liner of the tyre (such as 3 centimeters). An infrared distancer 202 could be provided in the front end of the spraying device, so as to accurately position the nozzle during the spraying operation. In addition, the nozzle 201 may also reciprocate along a width direction (i.e. an axial direction) of the tyre at a speed (such as 3 cm/sec) while carrying out the spraying operation, such that the spraying operation may be implemented on the inner liner of the tyre over the entire tread width L of the tyre.

Laser locators 203 could also be provided on both sides of the spraying device to accurately determine the moving distance of the nozzle in the width direction of the tyre, so as to guarantee that the high molecular organic material will not be sprayed in a location beyond the tread width L of the tyre. Furthermore, the laser locators 203 may also be used to position the nozzle 201 in the center of the tyre at the initial spraying stage.

By spraying the high molecular organic material on the inner liner of tyre only in a range of the tread width L of the tyre the following advantages could be achieved: as shown in FIG. 8, since the tread surface of the tyre is perpendicular to the ground when travelling, the high molecular organic material sprayed in the tread width L is also perpendicular to the ground, which could guarantee that the centrifugal force F generated by the rotation of the tyre will not drag the high molecular organic material away from its initial position to result in a poor dynamic balance.

If the high molecular organic material is sprayed in a range beyond the tread width L of the tyre, the centrifugal force F generated by the rotation of the tyre will generate a lateral component F1 in the high molecular organic material, which will drag the high molecular organic material to the both sides of the tyre and will result in the deformation of the layer of the high molecular organic material, so that the homogeneity as well as the dynamic balance of the coating of the high molecular organic material will be compromised.

With the aid of the automatic position of the laser locator 203, the accuracy of the spraying operation is dramatically improved, and thus the consistency and stability of the coating quality are guaranteed.

Following the spraying procedure 122, the centrifugal-rotation-maintaining procedure 123 is performed, which may be carried out on the tyre accelerating-and-maintaining device.

In the centrifugal-rotation-maintaining procedure 123, the nozzle is first moved out of the tyre 100 while the tyre 100 is kept on rotating in an upright rotating state with a rotational speed of 500 rpm, so that the high molecular organic material sprayed on the inner liner of the tyre 100 is allowed to uniformly flow on the inner liner of the tyre 100 by means of centrifugal force but not be deposited on the bottom of the tyre before being cooled, thereby ensuring the spraying uniformity of the high molecular organic material on the inner liner of the tyre 100.

In addition, the carbon chain of the high molecular organic material according to the present disclosure, which is broken in the high temperature, will be re-connected in the low temperature, so that the centrifugal force generated by the rotation in the process of the cooling of the high molecular organic material will make the molecular arrangement of the high molecular organic material become more orderly and thus generate a more stable structure as well as an improved ability of self-memory, as shown in FIG. 10.

When the temperature of the high molecular organic material on the inner liner of the tyre 100 is cooled down to about 140° C. naturally in the centrifugal-rotation-maintaining procedure 123, the adhesion of the high molecular organic material on the inner liner of the tyre is generally completed.

At this time, while being kept in the upright rotating state, the tyre 100 may be conveyed to a forced-cooling station of the system for manufacturing the HSST tyre according to the present disclosure to implement the forced-cooling step 130 to expedite the cooling of the tyre 100.

The tyre 100 may be conveyed to the forced-cooling station by a conveyor belt. The conveyor belt may be placed below the rotatable roller. The speed of movement of the conveyor belt may be adjusted by a control device, such that the tyre 100 is conveyed to the cooling station in a predetermined time period (such as 2 minutes).

The forced-cooling step 130 may include the following procedures: an air-cooling device setting up procedure 131, a forced-cooling procedure 132, and an adjusting procedure 133. The air-cooling device setting up procedure 131 is configured to set up the position of an air-cooling device with respect to the tyre 100.

In an embodiment of the present disclosure, the air-cooling device may be configured to include a body provided with a plurality of air outlets, and a delivery pipe connected to the body. The delivery pipe is adapted to deliver cooling gases to the body so that the cooling gases may be ejected through the air outlets. The air-cooling device may be fixed to a robot and move therewith.

The body of the air-cooling device may be configured to be rotational, such that the cooling gases can be rotationally ejected, which may accelerate the cooling of the tyre 100.

In the air-cooling device setting up procedure 131, the air-cooling device may be moved by the robot to the inside of the tyre, so as to be positioned at a height of 15 cm above the inner liner of the tyre 100 and at a middle position in the width direction of the tyre 100. Further, the air outlets of the air-cooling device are configured to face the inner liner of the tyre 100.

In the air-cooling device setting up procedure 131, the tyre 100 sprayed with the high molecular organic material is always kept in an upright rotating state at a rotational speed of 500 rpm. This may be implemented by an upright rotation-maintaining mechanism the same as the upright rotation-maintaining mechanism, and thus will not be described herein.

Following the air-cooling device setting up procedure 131, the forced-cooling procedure 132 is performed. In the forced-cooling procedure 132, the air-cooling device ejects the cooling gases at a speed of 3000 m³/h to cool the layer of high molecular organic material on the inner liner of the tyre 100. During the cooling, the air-cooling device and the tyre 100 also move toward an outlet of the forced-cooling station at the same speed with the relative position of the air-cooling device and the tyre 100 being maintained. This may be done with a conveying device, such as a conveyor belt.

The adjusting procedure 133 may be implemented concurrently with the forced-cooling procedure 132. The adjusting procedure 133 is configured to adjust parameters such as the conveying speed of the conveying device and the air output of the air-cooling device, so that the tyre can be conveyed to the outlet of the forced-cooling station just about three minutes later, and meantime the temperature of the high molecular organic material on the inner liner of the tyre may be lowered to 60° C.

In order to fulfill the adjustments, a plurality of real-time temperature detecting devices may be provided at a plurality of different positions of the forced-cooling station, so as to detect the inner liner temperature of the tyre when the latter is moved to a respective position.

Reference temperature at each position may be set in advance. When the tyre 100 is moved to a position, the real-time temperature detecting device disposed at this position detects the real-time temperature of the tyre 100 and transmits the detected real-time temperature to the control device, which compares the real-time temperature with the reference temperature at this position.

If a difference between the real-time temperature and the reference temperature at this position exceeds a threshold, the control device adjusts the conveying speed of the conveyor belt and/or the air output of the air-cooling device, so that the cooling rate of the tyre 100 may meet a predetermined requirement.

The control device may calculate an amount of adjustment with a corresponding algorithm. For example, the control device may calculate the amount of adjustment with an interpolation algorithm, and then adjust the conveying speed of the conveyor belt and/or the air output of the air-cooling device based on the calculated amount of adjustment. Of course, the control device may also calculate the amount of adjustment with other algorithms.

In an embodiment of the present disclosure, the real-time temperature detecting device may be configured as an infrared temperature sensing device.

The adjusting procedure 133 can, on one hand, ensure that the tyre 100 sprayed with the high molecular organic material has a stable cooling rate, thereby guaranteeing the performance stability and consistency of the manufactured HSST tyre; and on the other hand, ensure that each step of the process and the system may be completed within a predetermined period of time, which may guarantee the controllability of the operation of the entire system.

In addition, with the forced-air cooling step 130, the time taken to cool the tyre is also shortened from the conventional duration of about 20-40 minutes to 3 minutes, which significantly improves the production efficiency.

When the tyre 100 sprayed with the high molecular organic material is cooled to below 60° C. in the forced-cooling station, the tyre 100 may be removed from the conveyor belt and kept in an environment of not higher than 35° C. for 24 hours, in order to sufficiently stabilize the properties of the high molecular organic material and form the final HSST tyre 300.

According to an embodiment of the present disclosure, the forced-cooling station may be provided with a lifting device 151 as shown in FIG. 2 to unload the tyre 100 from the conveyor. According to another embodiment of the present disclosure, the forced-cooling station may be provided with a hydraulic cylinder or a pneumatic cylinder having an extensible shaft. With the aid of the extensible shaft of the hydraulic cylinder or the pneumatic cylinder, the tyre may be pushed down from the conveyor.

Returning to FIG. 1, the process for manufacturing the HSST tyre according to the present disclosure may further include a heating step 210 for heating the high molecular organic material 200 to a use temperature between 220° C. and 230° C.

The heating step 210 is performed in a heating station.

The heating step 210 may be performed concurrently with the cleaning step 110, the spraying step 120 and the forced-cooling step 130 of the tyre 100 as described above.

The heating step 210 may include the following procedures: a preheating procedure 211, a feeding procedure 212, and a heating procedure 213.

The preheating procedure 211 is configured to preheat the high molecular organic material previously fed in a heating furnace, and the amount of the high molecular organic material previously fed is about 80% of a volume of the heating furnace. The preheating procedure may be performed prior to the cleaning step 110 of the tyre 100.

In the preheating procedure 211, a heating device is started firstly to heat the high molecular organic material in the heating furnace to 150° C. Then, a stirring device is started to agitate the high molecular organic material, so that the high molecular organic material may be uniformly heated. When the high molecular organic material in the heating furnace is heated to 220° C., the preheating procedure 211 is completed.

After the preheating procedure 211 is completed, the feeding procedure 212 is performed. In the feeding procedure 212, the packaged high molecular organic material 200 is cut into cube-shaped blocks of 27 cm×27 cm×27 cm. The cube-shaped blocks are fed into the heating furnace at a speed of 6 minutes/block in a state where the high molecular organic material in the heating furnace reaches the temperature of 220° C.

The heating procedure 213 may be performed concurrently with the feeding procedure 212. In the heating procedure 213, the temperature inside the heating furnace is maintained between 225° C. and 240° C. using an automatic temperature control device, and the stirring device is rotated at a speed of 10 rpm to uniformly agitate the high molecular organic material in the heating furnace. In an embodiment of the present disclosure, the heating furnace has a capacity of about 200 liters and requires a heating power of about 60 kW/hr.

A delivering procedure may be carried out concurrently with the feeding procedure 212 and the heating procedure 213. In the delivering procedure, a delivery pipe may be used to deliver the melted high molecular organic material to the spraying device, so as to implement the spraying step 120. In an embodiment of the present disclosure, the diameter of the delivery pipe may be configured to be 2.5 mm.

In order to ensure that the temperature of the high molecular organic material does not decrease during the delivering procedure, temperature sensors and heaters may be disposed at different positions of the delivery pipe, so that the high molecular organic material may be maintained at the temperature ranging from 220° C. to 230° C. when ejected from the nozzle of the spraying device.

In an embodiment of the present disclosure, there is one temperature sensor and one heater for every 15 cm along the length of the delivery pipe. In an embodiment of the present disclosure, the temperature sensor and the heater may be replaced with a temperature-controlled heater having both temperature sensing and heating functions, so as to simplify the system.

In an embodiment of the present disclosure, different control devices may be provided to control the operation of corresponding devices in different stations.

However, the present disclosure is not limited thereto, and a central controller capable of simultaneously controlling and/or regulating the operation of each device in all the stations may be provided in the system for manufacturing the HSST tyre according to the present disclosure.

The process and the system for manufacturing the HSST tyre according to the present disclosure may achieve the following advantages:

1) All of the steps and procedures are accurately designed and controlled, which do not depend on the experience of operators, and thus guarantee the performance stability and consistency of the HSST tyre;

2) The conveyance and transfer of the tyres is automatically implemented by operating the corresponding conveying devices or transfer devices with control devices, which generally achieves the automation of the entire process;

3) By means of the air-cooling procedure and the forced-cooling step, the time taken to manufacture the HSST tyre is substantially shortened, making it possible to produce the HSST tyre in a large scale.

Although exemplary embodiments of this disclosure have been described, those skilled in the art should appreciate that many variations and modifications are possible in the exemplary embodiments without departing from the spirit and scope of the present disclosure. Accordingly, all such variations and modifications are intended to be included within the scope of this disclosure as defined in the claims.

EXPLANATION OF REFERENCE NUMBER

100: tire, 110: cleaning step, 111: soaking step, 112: scrubbing step, 113: sprinkling step, 114: upright rotating step, 115: air-drying step, 120: spraying step, 121: tyre-accelerating step, 122: spraying step, 123: centrifugal-rotation-maintaining step, 130: forced-cooling procedure, 131: air-cooling device setting up procedure, 132: forced-cooling procedure, 133: adjusting procedure, 150: scrubbing platform, 151: lifting device, 152: receiving component, 153: driving component, 154: tyre-holding device, 155: driving mechanism, 156: blocking mechanism, 157: rotatable rollers, 158: body, 159: extensible post, 160: pneumatic cylinder, 161: recess, 200: spraying device, 201: nozzle, 202: infrared distancer, 203: laser locator, 210: heating step 211: preheating procedure, 212: feeding procedure, 213: heating procedure, 300: HSST tyre, F: centrifugal force, F1: lateral component, L: tread width

The invention claimed is:

1. A system for manufacturing a high self-sealing tyre, comprising:

a cleaning station that cleans a tyre to be treated;

a spraying station that sprays a high molecular organic material that is heated onto an inner liner of the tyre; and a forced-cooling station that forcibly cools the tyre that has been sprayed with the high molecular organic material, wherein the cleaning station comprises:

a soaking tank holding therein an alcohol solution for soaking the tyre;

a scrubbing device that scrubs the inner liner of the tyre after soaking the tyre;

a sprinkling device that sprinkles the alcohol solution onto the tyre to rinse an inside and an outside of the tyre;

a tyre uprightly-rotating device having two spaced-apart rotatable rollers and configured to rotate the tyre by friction between a surface of the tyre and the rotatable rollers; and an air chamber that evaporates the alcohol solution on the tyre with air-drying gases, wherein the spraying station comprises:

a tyre accelerating-and-maintaining device that is configured to accelerate the tyre to a determined rotational speed and maintain the tyre at the determined rotational speed; and a spraying device that sprays the high molecular organic material that is heated onto the inner liner of the tyre to form thereon a layer of the high molecular organic material having self-sealing functions, wherein the forced-cooling station comprises:

an air-cooling device that performs a forced cooling of the tyre, in which the layer of the high molecular organic material is formed, by ejecting at least one cooling gas toward the tyre, wherein the scrubbing device is provided on a scrubbing platform, and a lifting device that automatically loads and unloads the tyre is provided, and wherein in the spraying device, the high molecular organic material, being heated to a temperature of at least 180° C., is sprayed onto the inner liner of the tyre while the tyre remains rotating at the determined rotational speed, in the air-cooling device, the high molecular organic material on the inner liner of the tyre is naturally cooled to at least 140° C. while the tyre remains rotating at the determined rotational speed, and then forcibly cooled to 60° C. or lower using the at least one cooling gas while the tyre remains rotating at the determined rotational speed, and the system further comprises a control device configured to adjust and set the rotational speed of the tyre by: (i) accelerating and maintaining a rotational speed at the determined speed during spraying and cooling, and (ii) setting the rotational speed during evaporation of the alcohol solution in the air chamber to be slower than said determined rotational speed used during the spraying and cooling.

2. A system for manufacturing a high self-sealing tyre according to claim 1, wherein the lifting device comprises;

a receiving component for receiving the tyre; and a driving component for driving the receiving component.

3. The system for manufacturing a high self-sealing tyre according to claim 2, wherein the receiving component is configured as a plate comprising a plurality of sections which could be folded to a certain degree relative to each other, so as to receive and hold the tyre.

4. The system for manufacturing a high self-sealing tyre according to claim 2, wherein the driving component is configured as a hydraulic cylinder or a pneumatic cylinder having an extensible shaft.

5. The system for manufacturing a high self-sealing tyre according to claim 1, wherein the scrubbing platform is provided with a tyre-holding device comprising a blocking mechanism to constrain the tyre to be treated in four locations of an upper side, a lower side, a left side and a right side.

6. The system for manufacturing a high self-sealing tyre according to claim 5, wherein the blocking mechanism comprises a plurality of extensible posts.

7. The system for manufacturing a high self-sealing tyre according to claim 1, wherein the air chamber is provided therein with at least one gas circulation mechanism for promoting circulation of the air-drying gases so that a uniform convection of the air-drying gases is formed in the air chamber.

8. The system for manufacturing a high self-sealing tyre according to claim 1, wherein a nozzle of the spraying device is configured to spray the high molecular organic material on the inner liner of the tyre in a range of tread width of the tyre.

9. The system for manufacturing a high self-sealing tyre according to claim 1, wherein the forced-cooling station comprises:

a temperature detection device detecting the actual temperature of the inner liner of the tyre, and a control device adjusting an air output of the air-cooling device based on real-time temperatures detected by the temperature detection device, so that the tyre is ensured to be cooled at a stable rate.

10. The system for manufacturing a high self-sealing tyre according to claim 1, further comprising a heating station for heating the high molecular organic material ready for spraying to a use temperature, the heating station comprises:

a heating furnace including a heating device and a stirring device; and a delivery pipe for delivering a melted high molecular organic material to the spraying device, wherein temperature sensors and heaters are provided at different locations of the delivery pipe to maintain the high molecular organic material at the use temperature.

11. The system of claim 1, wherein the control device is configured to set the tyre accelerating-and-maintaining device to accelerate the tyre to a determined rotational speed of 500 rpm and to maintain the tyre at the determined rotational speed of 500 rpm during the spraying and cooling.

12. The system of claim 11, wherein the control device is further configured to maintain the tyre rotation speed at 500 rpm such that, in the spraying device, the high molecular organic material, being heated to a temperature of at least 180° C., is sprayed onto the inner liner of the tyre while the tyre remains rotating at 500 rpm, and in the air-cooling device, the high molecular organic material on the inner liner of the tyre is naturally cooled to at least 140° C. while the tyre remains rotating at 500 rpm, and then forcibly cooled to 60° C. or lower using the at least one cooling gas while the tyre remains rotating at 500 rpm.

13. The system of claim 1, wherein the control device is configured to set the tyre uprightly-rotating device to rotate the tyre at a rotational speed of 300 rpm within the air chamber during evaporation of the alcohol solution.

* * * * *